Figure 1:
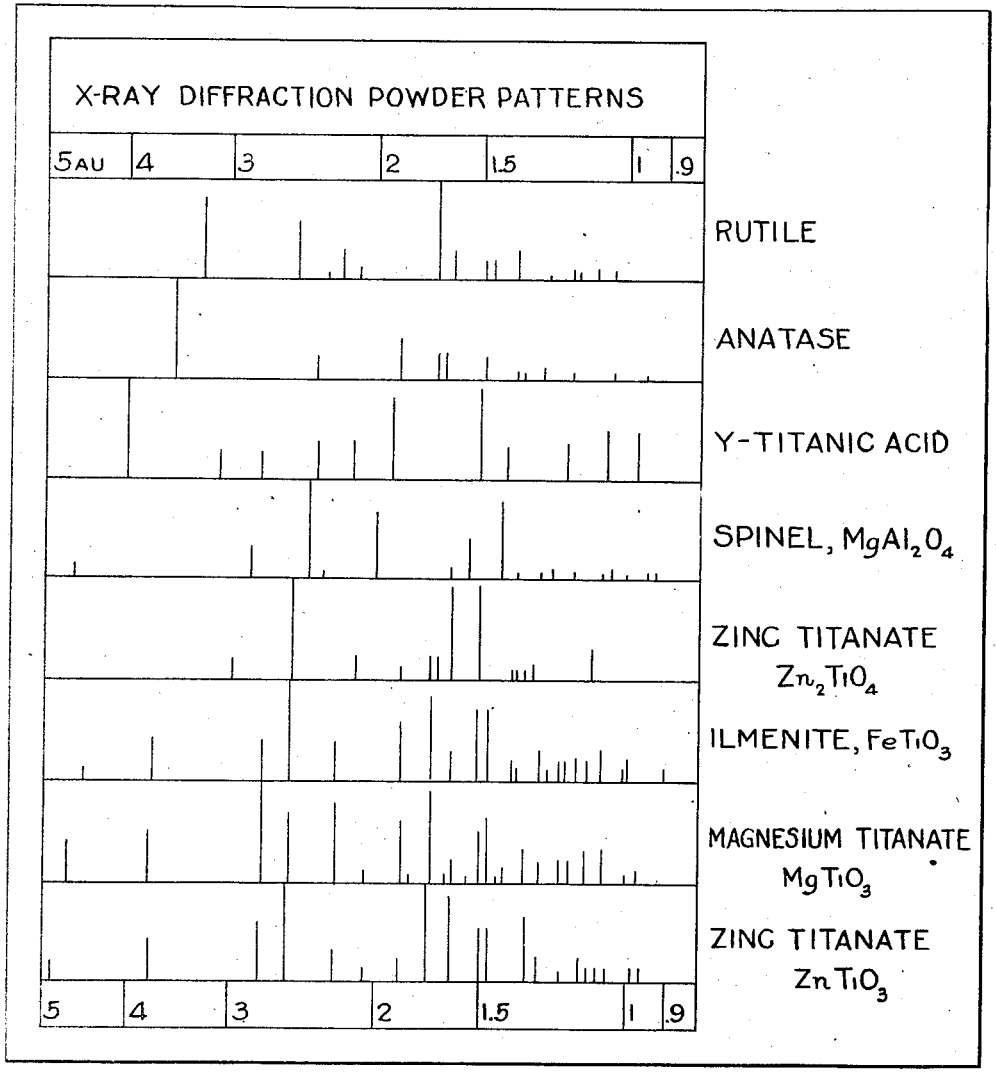

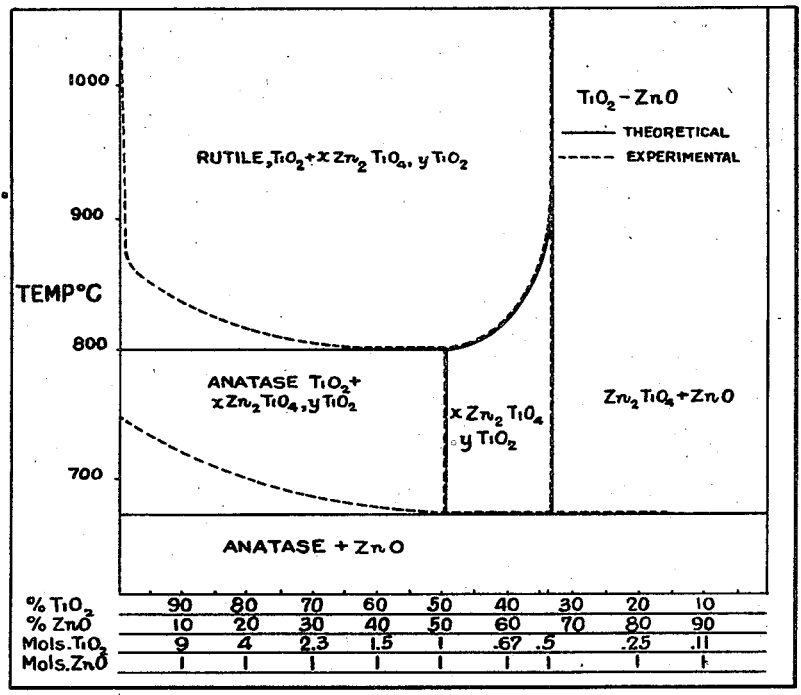
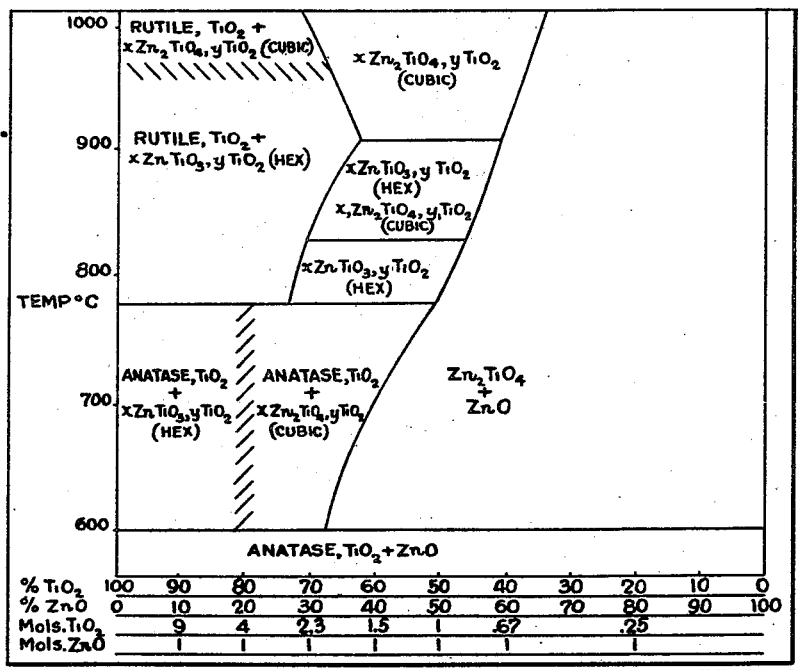

Patented June 26, 1945

2,379,019

UNITED STATES PATENT OFFICE 2,379,019

PREPARATION OF PIGMENTARY MATERIALS

Andrew T. McCord and Harold F. Saunders, Haddonfield, N. J., assignors to The Sherwin-Williams Company, Cleveland, Ohio, a company of Ohio Application May 29, 1942, Serial No. 445,022

23 Claims. (Cl. 106—300)

An object of this invention is to prepare pigments of high durability characteristics and excellent pigmentary properties, comprising titanium dioxide detectable by X-ray analysis as anatase or rutile, and/or compounds having the general formula $xRTiO_3.yTiO_2$, where R is a bivalent metal, where $y$ may be zero or a quantity, and where $TiO_2$ is titanium dioxide present in solid solution in the $RTiO_3$, and determinable by chemical analysis as an excess over the theoretical proportion for $RTiO_3$. More particularly, the present invention is concerned with pigments in which the R of $RTiO_3$ is zinc, and in the following specification we will describe in detail only that embodiment of the broader invention.

The high hiding power or obliterating power of titanium dioxide, particularly when in the pigmentary rutile modification is well known, and titanium dioxide is, therefore, a preferred pigment for white paints of all types, where the maximum obliteration of the surface to be painted is desired. One of the objections to titanium pigments for paint and other usage is the tendency for these pigments to chalk out of the paint film when exposed to weather. In tinted paints using titanium dioxide in combination with a coloring pigment, the chalking of the titanium induces a white, dusty surface on the paint film which lightens the apparent tint or color of the paint, and the effect is known as "fading." The titanates, such as zinc titanate or lead titanate, are far superior to titanium dioxide as respects chalk resistance and fading resistance when used with coloring pigments, but lack the superior hiding power of the titanium dioxide.

The addition of a titanate, such as zinc titanate or lead titanate, to paints formulated primarily with titanium dioxide as the principal pigment has been recommended for the purpose of improving resistance to chalking. In general, it has been found, however, that the proportion of titanate required to effect a satisfactory improvement in the resistance to chalking has been so great that the consequent drop in hiding power and color of the paint is excessive. We have found that when a relatively small amount of a titanate, especially one of the metatitanate type, is introduced into the titanium dioxide itself, in the manner hereinafter described, a considerable improvement in chalk resistance is obtained at the expense of only a minor reduction in the hiding power of paints made from this pigment. When the quantity of titanate so introduced is very small, there may be an actual improvement in the color and brightness.

Several processes have been devised for the conversion of anatase into rutile, mixtures of rutile and zinc orthotitanate ($Zn_2TiO_4$) and/or solid solutions of titanium oxide in zinc orthotitanate.

Thus, for example, Goldschmidt U. S. Patent No. 1,348,129 converts precipitated titanium dioxide to the rutile modification by heating at 900° C. to 1000° C. in the presence of a volatile halogen compound, as zinc chloride. Goldschmidt in U. S. Patent 1,436,164 converts the anatase form of titanium dioxide, as precipitated by thermal hydrolysis of an ilmenite solution, to a titanate by heating it, together with a compound of a bivalent metal compound such as a compound of calcium, strontium, barium, magnesium, lead, zinc, or manganese. Cole in U. S. Patent 2,184,938 obtains mixtures of titanium dioxide and solid solutions of titanium dioxide in zinc orthotitanate by heating titanium dioxide with varying proportions of a zinc compound in the presence of a phosphate compound. Booge, in U. S. Patent 2,253,551 produces titanium oxide in the rutile form intimately combined and associated with minor amounts of zinc orthotitanate by heating a mixture of titanium oxide of the anatase modification and a minor proportion of a zinc compound.

In all of these processes the titanium oxide used in the starting mixture has been the anatase modification either as precipitated by thermal hydrolysis from ilmenite solutions or titanium sulphate solutions, or from the calcination of these precipitates. The titanate obtained has been the zinc orthotitanate of cubic symmetry, and of the spinel structural type. (Cole and Nelson, J. Phys. Chem. vol. 42, Feb. 1938, pp. 245–251.)

We have found that when mixtures in varying proportions of γ-titanic acid and a metal oxide, such as zinc oxide, are heated, entirely different results are obtained as compared to similar treatment of similar mixtures but in which the titanium is supplied as anatase. As will be later pointed out, titanium dioxide in the γ-titanic acid modification does not conform to the teachings of prior art dealing with reaction between a titanium compound and a metal compound to form titanates.

The tendency for combination of the γ-titanic acid and an oxide, as zinc oxide, for example, is so noticeable even at 100° that, although the X-ray does not reveal conversion to titanate, the metal oxide is so tightly bound to the titanium by adsorption or otherwise that it cannot be extracted therefrom by leaching with the usual solvents for zinc oxide, such as ammoniacal ammonium chloride. (See Table III.) The titanates prepared from γ-titanic acid and a metal oxide in the manner described herein are highly suitable for use as pigments, possessing excellent texture, whiteness, brightness, hiding power, and resistance to weathering.

It is well known that the compound $Zn_2TiO_4$, zinc orthotitanate, crystallizes in the cubic system and possesses crystalline structure of the spinel type (Wyckoff's $MgAl_2O_4(k)$. (Wyckoff, The structure of crystals, 2nd edition (1931), p. 292.) The terms "symmetry" and "structure types" are used in this specification and the claims attached thereto in the same sense that they are employed in Wyckoff. On p. 287 of the reference, Wyckoff describes compounds $R_2MX_4$, type $(k)$ with the space group $O_h^7$. The pattern of $ZnTiO_3$ has not hitherto been published, and this compound has been found by us to be of hexagonal symmetry and of the $FeTiO_3$ or ilmenite structure type. Wyckoff's ilmenite, $FeTiO_3$ $(ax)$. (Wyckoff, The structure of crystals, Supplement, 2nd ed. (1935) page 54.)

The two titanates, zinc orthotitanate, $Zn_2TiO_4$, and zinc metatitanate, $ZnTiO_3$, possess specific and different lattice structures in which the elements are so arranged as to exhibit characteristic diffraction patterns comprising lines spaced substantially as shown in Fig. 1 of the accompanying drawings, when measured on a scale calibrated in Angstrom units (Å).

Zinc orthotitanate, $Zn_2TiO_4$, cubic. $a_0=8.46$Å.
Zinc metatitanate, $ZnTiO_3$, hexagonal.
$a_0=5.56$Å $\alpha=58° 38'$.

Fig. 1 also shows the lines of the pattern of the $FeTiO_3$ structure type. The presence of $TiO_2$ in solid solution in either of these titanates produces changes of minute order in line position and/or intensities in the powder diffraction patterns of the pure titanate, and solid solutions effects are easily demonstrable in a back-reflection camera or in a Laue pattern because of small changes in the length of the unit cell. As the quantity of titanium dioxide in solid solution in the titanate increases there is a slight change in the value of $a_0$.

In this specification and the claims appended thereto we use the term "zinc-titanium-oxygen compound of the spinel structure type" as meaning either the pure zinc orthotitanate of cubic symmetry and the spinel structural type, or a solid solution of titanium dioxide therein, of the formula $xZn_2TiO_4.yTiO_2$, in which $x$ and $y$ are whole numbers and $x$ is greater than $y$, and we define the term "zinc-titanium-oxygen compound of the ilmenite structure type" as meaning either the pure zinc metatitanate of hexagonal symmetry and the ilmenite structure type, or a solid solution of titanium dioxide therein, and of the general formula $xZnTiO_3.yTiO_2$.

We are aware that Lederle in U. S. Patent 2,140,235 states that zinc titanate pigments are obtained by heating zinc oxide with titanium dioxide in the proportion of at least 0.9 mol of zinc oxide to 1 mol of titanium dioxide at temperatures between 500° C. and 1100° C. He also states that between the limits of 1 to 1.5 mols of zinc oxide to 1 mol of titanium dioxide, with temperatures of 900 to 1100° C., mixtures of zinc titanate crystals of the spinel crystalline form with those of the corundum crystalline form are obtained, while at lower temperatures, for instance 500 to 900° C., mixed crystals of spinel form only are produced; that with proportions of more than 1.5 mols of zinc oxide to 1 mol of titanium dioxide, exclusively mixed crystals of zinc titanate having the structure of spinel are obtained. Lederle in U. S. Patent 2,140,236 states that the undesirable texture characteristics usually found in titanates obtained by heating together titanium dioxide and a metal oxide may be avoided by a combination of steps comprising mutual precipitation of the compounds, a two-stage calcination, and pressure treatment of the in-process materials. (It will be understood that the corundum crystalline form as referred to by Lederle is the same as the ilmenite structural type, the latter being the more recent nomenclature as employed by Wyckoff and Hanawalt for compounds of this type.)

The probable phase diagram covering the system $TiO_2/ZnO$ obtained by heating proportions of titanium dioxide in the form of anatase, such for instance as is derived from thermal hydrolysis of sulphate solutions of titanium in the usual commercial procedure with zinc oxide, is shown in solid lines in Fig. 2. The dotted lines are inserted to set forth experimental data on a limited time of heating of 12 hours.

The samples were prepared for X-ray examination by molding a mixture of the sample with a minor amount of glyceryl phthalate solution in mineral spirits as a binder into a solid rod 3mm. dia. x 15 mm. long. The rod was baked and then placed in the camera in such a manner that the rod forms one side of the defining slit, the other side being a block of brass. The X-ray beam was impinged upon the rod in the usual manner. The power was supplied by a General Electric XRD Unit consisting essentially of a 50 kv. transformer, a Kenotron rectifier and a G. E. CA-2 water-cooled X-ray tube with molybdenum target. The current employed for operation was 30 kv.P. with 20 ma.

It will be seen from the diagram Fig. 2 that by heating mixtures of zinc oxide with the anatase forms of titanium dioxide, for instance as from hydrolysis of ilmenite sulphate solution, the resulting titanates are primarily the zinc orthotitanate, $Zn_2TiO_4$, solid solutions of variable composition $xZn_2TiO_4.yTiO_2$, and mixtures of these with $TiO_2$ in either anatase or rutile forms, in agreement with Cole, as described in U. S. Patent 2,184,938, and Cole and Nelson J. Phys. Chem., vol. 42, Feb. 1938, pp. 245–251. The areas of the diagram agree reasonably well with those of Cole.

Table I

| Ratio ZnO/TiO² | Equivalent ratio TiO₂ZnO | Temp., °C. | U. S. 2,140,235 | Found |
|---|---|---|---|---|
| 1-1.5 / 1 | 1-0.66 / 1 | 900-1,100 | Mixture of zinc titanate crystals of the spinel crystalline form with those of the corundum crystalline form. | Mixtures of rutile and solid solution of variable component $xZn_2TiO_4.yTiO_2$ of spinel crystalline form only. No ilmenite type crystals found. |
| 1-1.5 / 1 | 1-0.66 / 1 | 500-900 | Mixed crystals of the spinel crystalline form. | Same as above at above 800°/C. Solid solution of variable composition $xZnTiO_4.yTiO_2$ of spinel structural type only, at between 665-800°C. |
| Excess of 1.5 / 1 | Below .66 / 1 | | Mixed crystals of zinc titanates having the crystalline structure of spinel. | Rutile and/or solid solution of variable components $xZn_2TiO_4.yTiO_2$ of spinel crystalline form. |
| Excess of 2 / 1 | Below .5 / 1 | | Excess ZnO is not bound | $Zn_2TiO_4$ with unbound ZnO. |
| Less than 1 / 1 | Above 1 / 1 | 900-1,100 | | Rutile and a solid solution of variable proportions $xZn_2TiO_4.yTiO_2$ (spinel crystal type). |
| Less than 1 / 1 | Above 1 / 1 | 800-900 | | Same as for 900-1000°. |
| Less than 1 / 1 | Above 1 / 1 | 650-800 | | Anatase and a solid solution of variable crystals $xZn_2TiO_4.yTiO_2$, (spinel crystal type). |

By the term "γ-titanic acid" as used both in this specification and the claims attached thereto, we mean that form of hydrous titanium oxide which may be obtained from a variety of procedures, such for instance, as that disclosed in application Serial No. 349,345, filed August 1, 1940 (Patent No. 2,326,156), and which is characterized by properties of high degree of solubility in mineral acids, and of being directly convertible to rutile without the use of sintering agents or accelerating agents when calcined at temperatures of as low as 800 to 900° C., and particularly by possessing a characteristic crystalline structure in which the chemical constituents are so arranged in the lattice as to produce upon X-ray analysis a characteristic band pattern, the bands of which are spaced on a scale measured in angstrom units to correspond to the positions indicated in Fig. 1, and to those set forth in the table given in Patents Nos. 2,326,156 and 2,326,157, issued August 10, 1943.

The corresponding characteristic lines of the two pure zinc titanates upon the same scale in angstrom units, are shown in Table II.

Table II

| ZnTiO₃ Å | Hexagonal ilmenite type | | Zn₂TiO₄ cubic spinel type Å |
|---|---|---|---|
| | Intensity | hkl | |
| 4.925 | .02 | 111 | |
| 3.750 | .24 | 110 | 2.97 |
| 2.77 | .80 | 211 | |
| 2.575 | 1.00 | 110 | 2.54 |
| 2.245 | .40 | 210 | 2.11 |
| 2.075 | .08 | 200 | |
| 1.875 | .40 | 220 | 1.84 |
| 1.737 | .60 | 321 | 1.73 |
| 1.630 | .50 | 211 | 1.69 |
| 1.500 | .50 | 310 | 1.63 |
| 1.465 | .60 | 211 | 1.50 |
| 1.320 | .60 | 432, 433 | 1.375 |
| 1.2875 | .08 | 220 | 1.355 |
| 1.200 | .16 | 310 | 1.33 |
| 1.145 | .20 | | 1.30 |
| 1.120 | .08 | 420 | 1.285 |
| 1.085 | .08 | | 1.12 |
| 1.065 | .08 | 522, 532 | 1.10 |
| .990 | .12 | 521, 531 | 1.04 |
| .970 | .16 | 411, 321, 511 | .975 | hkl—Miller indices.

That γ-titanic acid possesses other properties distinguishing it among reactive titanium dioxides from that of the anatase form produced, as for instance by thermal hydrolysis of ilmenite sulphate solutions, is further evidenced by its reactivity toward zinc oxide. A mechanical mixture of 85% γ-titanic acid and 15% zinc oxide was wetted out with a small quantity of water for good mixing and dried at low temperature, approximately 70° C. A similar mixture of hydrous oxide of the anatase form obtained by thermal hydrolysis of ilmenite sulphate solution was prepared in the same manner with zinc oxide. Portions of each mixture before and after calcination at a range of temperatures were extracted by extraction procedure #1, below. A second portion of each sample was extracted by extraction procedure #2 below.

In Table III, following, col. 3 shows the percentage of the total ZnO present, which remained with the extracted residue as fixed, or in some manner closely adherent to TiO₂, and col. 4 shows as a percentage of the total sample taken, the ZnO which was extracted in the procedure. The high retention of the ZnO by γ-titanic acid as compared to anatase at low temperature, is not only indicative of a high reactive or absorption value, but is a distinguishing feature between the two titanium compounds. This table also indicates that after heating at temperatures above that at which rutile is formed, more free or unbound TiO₂ is released as rutile from the mixture with γ-titanic acid than from that with anatase.

*Extraction procedure #1.*—A sample of sufficient quantity to be equivalent to 0.5 gram of ZnO is heated to 60° C. with 100 cc. of a mixture of 200 g. NH₄Cl, 450 g. 30% NH₄OH and 750 g. water, for 30 minutes. Dilute to 250 cc. and filter. An aliquot portion of the filtrate is neutralized with HCl, and add 10 cc. excess HCl. Make up to 200 cc. and titrate with K₄Fe(CN)₆ using uranium nitrate outside indicator to determine ZnO.

*Extraction procedure #2.*—Same as #1, except that the extraction mixture consists of an ammoniacal ammonia carbonate solution containing 120 g. NH₃ and 110 gm. CO₂ per liter.

Table III

| Col. 1 Mixture | | Col. 2 Temp., °C. | Col. 3 Percent fixed ZnO procedure | | Col. 4 Percent ZnO extracted procedure | | Col. 5 TiO₂ used in mixture |
|---|---|---|---|---|---|---|---|
| Percent TiO₂ | Percent ZnO | | 1 | 2 | 1 | 2 | |
| 85 | 15 | 80 | 27.4 | 31.0 | 10.9 | 10.4 | γ-titanic acid. |
| 85 | 15 | 750 | 60.1 | 63.0 | 5.9 | 5.6 | Do. |
| 85 | 15 | 875 | 66.6 | 66.0 | 5.0 | 5.1 | Do. |
| 85 | 15 | 975 | 73.3 | 79.3 | 4.0 | 3.1 | Do. |
| 85 | 15 | 80 | None | None | 15.1 | 14.9 | Anatase. |
| 85 | 15 | 750 | 41.3 | 44.6 | 8.8 | 8.3 | Do. |
| 85 | 15 | 875 | 71.3 | 71.3 | 4.3 | 4.3 | Do. |
| 85 | 15 | 975 | 81.3 | 82.0 | 2.8 | 2.7 | Do. |

Fig. 3 on the accompanying drawings shows the phase diagram for the system titanium oxide-zinc oxide when the titanium component of the starting mixture is the hydrous titanium oxide defined herein as "γ-titanic acid." The zinc oxide may be supplied as the oxide or as any compound of zinc, such for example as zinc sulphate or zinc chloride, or even as finely powdered zinc metal, which will be converted to the oxide under the conditions of heating employed, and if, in the case of the use of zinc metal, sufficient oxygen is present to supply the required amount for conversion to oxide. The γ-titanic acid and the zinc compound may be brought together in any desired manner. We prefer to employ the wet cake carrying 10 to 80% moisture as obtained by washing and filtering the precipitate obtained by contacting an aqueous solution of ammonium fluotitanate with aqua ammonia in the manner described in Patent No. 2,326,156, and incorporating dry zinc oxide into this wet cake by thorough and complete mixing, and then feeding the mixture into a rotary calciner maintained at such speed of rotation that the material will be in the effective calcination zone for a period of from two to four hours. In determining the exact conditions of calcination our usual procedure is, having predetermined the ratio of γ-titanic acid to zinc oxide desired, and mixed the two, the temperature of the heating apparatus is set according to the product desired, as determined from Fig. 3. The speed of rotation when a rotary calciner is used for the heating, or the time between charging and discharging of a muffle or other type of furnace is employed, is determined by operation. Samples of the discharge upon examination by X-ray disclose by their pattern whether or not the time of heating is sufficient, and the operation period is adjusted accordingly.

If desired, however, the bringing together of the starting components may be effected in a number of other ways, such as adding the zinc compound to one of the liquors used for precipitating the γ-titanic acid, by adding a soluble zinc compound to the slurry of γ-titanic acid and then precipitating the zinc by addition of a suitable reagent, or by dry mixing of dry γ-titanic acid with the dry zinc compound. The mixture may be dried previous to calcination, rather than fed wet, or the calcination may be accomplished in other types of furnaces such as a muffle furnace.

In order to accomplish the desired end, i. e., a product of the composition $x\text{ZnTiO}_3 \cdot y\text{TiO}_2$ associated with either anatase or rutile, the proportion of the starting materials must be such as to provide an excess of one mol weight of $\text{TiO}_2$ for each mol of ZnO. With proportions between 1 and 1.5 mol weight of $\text{TiO}_2$ to 1 mol weight of ZnO at temperatures between about 600° C. and 775° C., the products will show upon X-ray examination, either the characteristic superimposed patterns of anatase titanium dioxide and a zinc-titanium compound of the spinel structure type, $x\text{ZnTiO}_4 \cdot y\text{TiO}_2$ or of $\text{Zn}_2\text{TiO}_4$ plus unbound ZnO. A portion of the $\text{TiO}_2$ is in solid solution in the orthotitanate. At between about 775° C. and 900° C., the products upon X-ray examination show the patterns of both a zinc-titanium compound (cubic zinc orthotitanate) of spinel type and one (hexagonal zinc metatitanate) of the ilmenite type, with no titanium oxide pattern unless the time of heating has been too short for complete conversion. Above about 900° C. the patterns show only the presence of spinel type crystals.

In reading the diagram, Fig. 3, it will be understood that within a zone, as the proportions of $\text{TiO}_2$ over ZnO decrease, the $y$ factor of the $\text{TiO}_2$ component also decreases, since the excess of $\text{TiO}_2$ over ZnO decreases as compared to the theoretical, and as a greater percentage of the total $\text{TiO}_2$ above the theoretical is present in solid solution.

When interpreting the temperatures of heating herein employed, it is to be understood that an accompanying time factor sufficient to permit stabilization of the phase at that temperature is to be taken. We have found that for the range covered, a period of time up to one hour may still show traces of compounds belonging normally within the zone for a lower temperature, especially in the region of transition where two zones, as shown in Fig. 3, meet. Above 1 hour the products are reasonably well stabilized, and at 4 hours usually completely so, and further extension of time effects no further changes.

As shown by the diagrams in Fig. 2 and Fig. 3, below 600° C. titanate formation has not occurred to any appreciable extent. However, by great prolongation of time some degree of titanate formation may be effected, and we have found that at 450° for 100 hours some titanate had formed, while with 150 hours at 430°, which was the lowest temperature at which any pattern of a titanate was observed, a very faint indication of titanate could be detached in the X-ray pattern. Such prolongation of time is, of course, impractical from any industrial standpoint.

At proportions of 1.5 to about 4 mols of $\text{TiO}_2$ as γ-titanic acid (Fig. 3) with 1 mol of ZnO, and temperatures between 600° and 775° C., the products show X-ray patterns of crystals of the spinel type and anatase, while at the same temperature range for proportions of greater than about 4 mols of $\text{TiO}_2$ to 1 mol of ZnO, the X-ray pattern shows only crystals of the ilmenite structural type and anatase. Within the range of between 1 and about 1.5 mols of $\text{TiO}_2$ to 1 mol of ZnO, and within the temperature range of about 825° to 900° C., X-ray examination of the products shows patterns of both the spinel and the ilmenite type of crystals. Within this mol range, as the temperature approaches 800° C., the spinel pattern is entirely absent, or at most only extremely faint, and within a restricted zone of 775 to 825° C., only the patterns of the ilmenite structure type are found, any excess $\text{TiO}_2$ present above the theoretical for the metatitanate, $\text{ZnTiO}_3$, being present in solid solution in the $\text{ZnTiO}_3$.

With proportions of greater than about 2 mols of $\text{TiO}_2$ to 1 mol of ZnO, at between about 775 and 975° C., the products upon X-ray examination show exclusively the patterns due to zinc-titanium-oxygen compounds of the ilmenite type, i. e., $x\text{ZnTiO}_3 \cdot y\text{TiO}_2$, and rutile, while above this temperature the patterns are those of the spinel structure type, and rutile.

It will thus be evident from Fig. 2 that for all proportions of a mixture of titanium dioxide and zinc oxide, when the $\text{TiO}_2$ is supplied in the anatase modification, as for example, the precipitated hydrous oxide obtained from hydrolysis of titanium sulphate solution, heating induces primarily the formation of the cubic zinc orthotitanate which upon X-ray examination produces patterns of the spinel structure type. Below about 800° C., TiO₂ in excess of that required to produce Zn₂TiO₄ is in solid solution, $$xZn_2TiO_4.yTiO_2$$

and when the temperature is raised above 800° C., a part or all of this excess TiO₂ is set free in the form of rutile.

When, however, the titanium oxide in the mixture is supplied as γ-titanic acid, and TiO₂ is in molecular excess over the ZnO present, the major reaction is toward the formation of the hexagonal zinc metatitanate, and X-ray examination reveals this metatitanate to be of the ilmenite structural type, so that products obtained with proportions of more than 1 mol weight of TiO₂ as γ-titanic acid to each mol of ZnO primarily show upon X-ray examination the characteristic patterns of the ilmenite type plus titanium dioxide, the titanium dioxide being of the anatase or rutile modification according to the temperature employed. When it is known that the TiO₂ present is in excess of the theoretical for the molecular ratio TiO₂ to ZnO, but TiO₂ lines of titanium dioxide either in anatase or rutile modification are not found in the X-ray pattern, or are found to an insufficient degree, as indicated by the chemical proportions, the excess is assumed to be in solid solution in the titanate.

Above 600° C., if the time factor is sufficient, and we have found that a 2 hour heating period is usually sufficient, there will be in the material no unbound or free zinc oxide as determinable by X-ray analysis, and one of the objects of our invention is to provide a material containing unbound titanium dioxide but substantially no zinc other than as the titanate.

Without wishing to be bound by theoretical considerations as to the reason why titanium dioxide in the form of γ-titanic acid behaves entirely differently from titanium dioxide in the form of anatase in its reaction to temperatures in the ZnO/TiO₂ system, we believe that such difference is a function of its inherently greater reactivity than those other forms of titanium oxide, even though the latter do possess sufficient activity to be termed "reactive." This is shown in that γ-titanic acid may of itself be directly converted to rutile at temperatures between 800° and 900° C., without the addition of any fluxing or sintering agent, whereas the anatase type of prior art may be heated above 1000° C. without converting to rutile.

Where γ-titanic acid is heated through an increasing temperature range, it is converted, as shown by the X-ray, first into anatase at the lower temperatures, and then, as the temperature reaches the vicinity of 750 to 800 C., into the rutile modification. No difference between the anatase obtained from heating γ-titanic acid at temperatures below about 750° C. and the anatase obtained by calcination at similar temperatures of the hydrous oxide produced by thermal hydrolysis of titanium sulphate solution has been found by the X-ray, but that an inherent difference does exist is demonstrated by the fact that at very slightly higher temperatures the former is converted to rutile while the latter resists such conversion.

The principles and practice of our invention have been set forth in the preceding discussion and in Fig. 3. The use of specific examples would seem unnecessary, and since the range of proportion and temperature is great, it is impractical to cover the entire field by such specific examples. The following will illustrate the process rather than cover it.

*Example 1.*—Illustrating method of preparation of a pigmentary zinc titanate of the type $xZnTiO_3.yTiO_2$ wherein the TiO₂ is in excess of that required by the zinc present to form ZnTiO₃, but which upon X-ray analysis shows only the patterns of the ilmenite structure type.

To 200 lbs. of an aqueous slurry of γ-titanic acid containing 60 lbs. of TiO₂ is added 40 lbs. of high grade zinc oxide, and thoroughly mixed. (Mol ratio approximately 1.5 mols TiO₂ per mol of ZnO.) The mixture is partially dewatered by filtration followed by drying at 100° C., and then heated for four hours at 800° C. The product is a white pigment of high brightness, of good resistance to chalking, and excellent covering power, and upon X-ray analysis exhibits a powder diffraction pattern containing substantially only those lines which are characteristic of a zinc-titanium compound of the ilmenite structure type, although chemical assay reveals an excess of TiO₂ over the ZnO necessary to form ZnTiO₃.

*Example 2.*—Illustrating method of preparation of a pigmentary zinc titanate composition of the type anatase plus $xZnTiO_3.yTiO_2$, wherein the TiO₂ is in excess of that required by the zinc present to form ZnTiO₃, and which upon X-ray analysis exhibits both the patterns of hexagonal ZnTiO₃ of the ilmenite structure type and of TiO₂ of the anatase modification.

A quantity of γ-titanic acid obtained by contacting an aqueous solution of ammonium fluotitanate, (NH₄)₂TiF₆ with aqueous ammonia, washing, dewatering, and drying, and containing by analysis 90 pounds of TiO₂ is dry mixed with 10 pounds of high grade zinc oxide (mol ratio approximately 9 mols of TiO₂ to 1 mol of ZnO). The mixture is heated at 725° C. for two hours. The product upon X-ray analysis exhibited substantially only the characteristic patterns of a zinc-titanium compound of the ilmenite structure type and titanium oxide of the anatase modification.

*Example 3.*—Illustrating the preparation of a pigmentary zinc titanate compound of the type rutile plus $xZnTiO_3.yTiO_2$, wherein the TiO₂ is in excess of that required to form ZnTiO₃, and which upon X-ray analysis exhibits the characteristic patterns of both hexagonal zinc metatitanate of the ilmenite structural type and titanium oxide of the rutile modification.

The mixture of γ-titanic acid and zinc oxide of Example 2 is heated for 4 hours at 900° C. Upon X-ray examination the product exhibits the characteristic patterns of a zinc-titanium-oxygen compound of the ilmenite structure type and titanium oxide of the rutile modification.

*Example 4.*—Illustrating the method of preparation of a pigmentary zinc titanate composition of the type $xZnTiO_3.yTiO_2$ mixed with $xZn_2TiO_4.y''TiO_2$, and which upon X-ray analysis exhibits a pattern characteristic of a mixture of crystals of the spinel and the ilmenite structure type with those of ilmenite structure predominating.

A quantity of γ-titanic acid obtained as in

Example 2, and equivalent to 100 lbs. of TiO$_2$ is mixed with 50 lbs. of high grade zinc oxide. The mixture is heated for four hours at 850° C. until a portion removed as a sample exhibits upon X-ray analysis, substantially only the patterns characteristic of crystals of ilmenite structure type with a minor amount of crystals of the spinel type.

*Example 5.*—Illustrating the use of zinc sulphate instead of zinc oxide.

A solution of zinc sulphate in water was prepared by adding sufficient purified crystal zinc sulphate to water to be equivalent to 10 pounds of ZnO in 100 pounds. Into this solution was added a quantity of dried γ-titanic acid containing 500 pounds of TiO$_2$, and the mass thoroughly mixed in a blade mixer. The mass was then heated at a temperature of 930° C. for a period of four hours. The product was rutile associated with a minor amount of a zinc-titanium-oxygen compound of the ilmenite structure type, and upon pulverization showed excellent pigmentary properties of texture, color and hiding power.

*Example 6.*—A mixture was prepared in the same manner as in Example 5, except that zinc chloride was used in place of zinc sulphate. The mixture was heated for 4 hours at 800° C., and the product was of pigmentary rutile associated with a minor amount of a zinc-titanium-oxygen compound of the ilmenite structure type.

*Example 7.*—The procedure of Example 3 was followed, except that anatase obtained by the thermal hydrolysis of ilmenite sulphate solution was used instead of γ-titanic acid. Upon X-ray examination the product showed the characteristic pattern of a zinc-titanium-oxygen compound of the spinel structure type, and titanium dioxide of the rutile modification.

We have further found that the whole or a part of the zinc in the mixture of γ-titanic acid with zinc oxide or a compound of zinc which may be converted to the oxide by heating, may be replaced by magnesium, or by other metal element which will combine with the γ-titanic acid upon heating to form a titanate of the type RTiO$_3$, or which will to some extent go into solid solution as the oxide in the titanate to give a compound of the type $x$RTiO$_3$.$y$(R.Ti)O$_2$, where R may be Zn, or other bivalent metal or a mixture of two or more bivalent metals. Certain very definite pigmentary advantages may be obtained by effecting the formation of these multimetal compounds of the ilmenite structural type and solid solutions of metal oxides in such titanates. By proper proportioning of the metals, different combinations of chemical and weathering resistance, chalking and fading resistance, and color tones result. A marked superiority in color brilliance or tone and color strength is found in the products resulting from heating together γ-titanic acid and compounds of iron, nickel, manganese, or other bivalent metal, or mixtures of these compounds, which produce colored titanates, as compared to similar treatment of similar mixtures with anatase.

For this purpose the metal element may be added as oxide, hydroxide, carbonate, sulphate, chloride, or other compounds which produce the oxide upon heating.

The superiority of the products made by our process will be apparent from the data given in the following table:

*Table IV*

| Ingredients, percent | | | Tinting Strength | Percent reflectance | | |
|---|---|---|---|---|---|---|
| γ-titanic | Anatase | ZnO | | Blue | Amber | Green |
| 40 | | 60 | 600 | 81.9 | 86.0 | 86.3 |
| 45 | | 55 | 675 | 82.8 | 86.5 | 86.8 |
| 50 | | 50 | 725 | 82.5 | 86.0 | 85.9 |
| 55 | | 45 | 775 | 84.4 | 87.4 | 88.0 |
| 60 | | 40 | 825 | 84.6 | 87.8 | 88.2 |
| 65 | | 35 | 925 | 85.4 | 87.8 | 88.5 |
| 70 | | 30 | 1025 | 85.9 | 88.4 | 89.0 |
| 75 | | 25 | 1100 | 86.1 | 88.6 | 89.2 |
| 80 | | 20 | 1200 | 86.2 | 88.8 | 89.6 |
| | 40 | 60 | 325 | 78.5 | 85.0 | 84.7 |
| | 45 | 55 | 425 | 79.7 | 85.5 | 85.6 |
| | 50 | 50 | 475 | 79.6 | 85.6 | 85.5 |
| | 55 | 45 | 525 | 79.4 | 85.2 | 85.3 |
| | 60 | 40 | 625 | 82.0 | 86.6 | 86.9 |
| | 65 | 35 | 675 | 83.0 | 87.3 | 87.6 |
| | 70 | 30 | 750 | 84.0 | 87.8 | 88.0 |
| | 75 | 25 | 800 | 84.0 | 87.7 | 88.0 |
| | 80 | 20 | 850 | 84.6 | 88.2 | 88.6 |

An examination of the columns will show the following. For equivalent mixtures of titania and zinc oxide those products obtained when γ-titanic acid was the starting material, possess several more points of tinting strength than do the corresponding products when anatase was used as the starting material.

The tinting strength of a white pigment is a measure of its ability to whiten the tint of a colored pigment mixed with it, and is relative in nature, being compared to a standard to which is affixed an arbitrary value. The tinting strength of the white pigments reported herewith were determined in general accordance with the method A. S. T. M. designation D-332-36, with the exception that the Hoover automatic muller was used in place of the hand mulling described in the procedure. Pastes were prepared by mulling together the white pigment, ultramarine blue, and acid refined linseed oil of 12.5 acid number. The proportions used were 1.500 grams of the sample pigment, 0.300 gram of ultramarine blue and 1.25 cc. of oil. These quantities were given a preliminary mixing with a spatula, mulled for 150 revolutions of the plates in the Hoover muller with a pick up after each fiftieth revolution, and graded by by placing the paste on a glass slide between similar smears of standards of higher and lower strength, these standards having previously been prepared in a similar manner as described for the preparation of the sample, except for the amount of blue, which is increased or decreased in 5% increments. The standard used was a commercial anatase titanium dioxide pigment which was arbitrarily assigned a tinting strength of 1250, and the methods of grading to standard and calculating the tinting strength was in conformance with the A. S. T. M. designation previously referred to.

Reflectance is the ratio of light reflected from a sample to that reflected from a standard magnesium oxide under conditions of equal diffuse illumination as viewed from a direction normal to the surface. The reflectance or percent brightness of the samples in this series were determined upon a surface prepared as follows:

1.500 grams of the pigment sample was mixed and mulled with 3.86 cc. of a dammar varnish. The pastes were then drawn down over a black and white surface by means of a doctor blade so arranged as to leave a wet film of 0.003" thickness. The films were then dried. Reflectance was determined with the standard blue, green and amber filters of the Hunter Reflectometer. The procedure for the determination of the brightness or reflectance is described in the National Bureau of Standards Research Paper 1345.

The anatase derived titanates were all definitely of poorer texture, i. e., harder and more difficult to pulverize, than the corresponding γ-products. The X-ray analysis of all these compounds corresponds to that which would be expected from the diagrams of Figs. 2 and 3.

Having thus described our invention, what we claim as new and desire to secure by Letters Patent is:

1. Method of preparing a pigmentary material, which comprises heating a mixture of γ-titanic acid and a zinc compound selected from the group consisting of zinc oxide and compounds of zinc which yield zinc oxide on heating, in such proportions that for every mol of ZnO in said mixture there will be present more than one mol of $TiO_2$, said heating being at a temperature between about 600 and 975° C., and until upon X-ray examination of the material, among those lines of the diffraction pattern which are due to compounds of zinc, substantially only those lines are found which are characteristic of a zinc-titanium-oxygen compound of hexagonal symmetry and of the ilmenite structure type, the mol ratio of ZnO to $TiO_2$ being between 1 to 1 and 1 to about 2.3 if the heating be to a temperature between 775° C. and 825° C., and the mol ratio being 1 to more than about 2.3 if the heating be to a temperature between 775° C. and 975° C., and the mol ratio being 1 to more than 4 if the heating be to a temperature of between 600° C. and 775° C.

2. Method of preparing a pigmentary material, which comprises heating a mixture of γ-titanic acid and a zinc compound selected from the group consisting of zinc oxide and compounds of zinc which yield zinc oxide on heating, in such proportions that for every mol of ZnO in said mixture there will be present more than 4 mols of $TiO_2$, said heating being at a temperature between about 600 and 775° C., and until upon X-ray examination of the material, among those lines of the diffraction pattern which are due to compounds of zinc, substantially only those lines are found which are characteristic of a zinc-titanium-oxygen compound of hexagonal symmetry and of the ilmenite structure type.

3. Method of preparing a pigmentary material which comprises heating a mixture of γ-titanic acid and a zinc compound selected from the group consisting of zinc oxide and compounds of zinc which yield zinc oxide on heating, in such proportions that for every mol of ZnO in said mixture there will be present more than 4 mols of $TiO_2$, said heating being at a temperature between 600 and 775° C., and until upon X-ray examination of the material there is found in the diffraction pattern substantially only those lines which are characteristic of anatase and of a zinc-titanium-oxygen compound of hexagonal symmetry and of the ilmenite structure type.

4. Method of preparing a pigmentary anatase associated with a zinc titanate of the general formula $xZnTiO_3.yTiO_2$, which comprises heating a mixture of γ-titanic acid and a zinc compound selected from the group consisting of zinc oxide and compounds of zinc which yield zinc oxide on heating, in such proportions that for every mol of ZnO in said mixture there will be present more than 4 mols of $TiO_2$, said heating being at a temperature between about 600 and 775° C., and for a sufficient period of time to convert all of the zinc present to zinc metatitanate of hexagonal symmetry and of the ilmenite structure type, and containing $TiO_2$ in solid solution.

5. Method of preparing a pigmentary material which comprises heating a mixture of γ-titanic acid and a zinc compound selected from the group consisting of zinc oxide and compounds of zinc which yield zinc oxide on heating, in such proportions that for every mol of ZnO in said mixture there will be present between 1 and 3 mols of $TiO_2$, said heating being at a temperature between about 775 and 825° C., and until upon X-ray examination of the material, among those lines of the diffraction pattern which are due to compounds of zinc, substantially only those lines which are characteristic of a zinc-titanium-oxygen compound of hexagonal symmetry and of the ilmenite structure type are found.

6. Method of preparing a pigmentary material which comprises heating a mixture of γ-titanic acid and a zinc compound selected from the group consisting of zinc oxide and compounds of zinc which yield zinc oxide on heating, in such proportions that for every mol of ZnO in said mixture there will be present between 1 and 3 mols of $TiO_2$, said heating being at a temperature between about 775 and 825° C., and until upon X-ray examination of the material the diffraction pattern is found to contain substantially only those lines which are characteristic of a zinc metatitanate of hexagonal symmetry and of the ilmenite structure type.

7. Method of preparing a compound of the general formula $xZnTiO_3.yTiO_2$, which comprises heating a mixture of γ-titanic acid and a zinc compound selected from the group consisting of zinc oxide and compounds of zinc which yield zinc oxide on heating, in such proportions that for every mol of ZnO in said mixture there will be present between 1 and 3 mols of $TiO_2$, at a temperature between 775 and 825° C., for a sufficient period of time to convert all of the zinc present to zinc metatitanate of hexagonal symmetry and of the ilmenite structure type, and containing $TiO_2$ in solid solution.

8. Method of preparing a compound of the general formula $xZnTiO_3.yTiO_2$, and wherein the $TiO_2$ in excess of that required to form $ZnTiO_3$ is in solid solution in the $ZnTiO_3$, which comprises heating a mixture of γ-titanic acid and a zinc compound selected from the group consisting of zinc oxide and compounds of zinc which yield zinc oxide on heating, in such proportions that for every mol of ZnO in said mixture there will be present between 1 and 3 mols of $TiO_2$, at a temperature between 775 and 825° C., for a sufficient period of time to convert substantially all of the zinc present to zinc metatitanate of hexagonal symmetry and of the ilmenite structure type, and containing $TiO_2$ in solid solution.

9. Method of preparing a pigmentary material which comprises heating a mixture of a zinc compound selected from the group consisting of zinc oxide and compounds of zinc which yield zinc oxide on heating, and hydrous titanium oxide in the γ-titanic acid modification, in such proportions that for every mol of ZnO in said mixture there will be present more than about 2 mols of $TiO_2$, at a temperature between about 775 and 975° C., until upon X-ray examination of the material, among those lines of the diffraction pattern which are due to compounds of zinc, substantially only those lines which are characteristic of a zinc-metatitanate of hexagonal symmetry and of the ilmenite structure type are found.

10. Method of preparing a pigmentary material which comprises heating a mixture of a zinc compound selected from the group consisting of zinc oxide and compounds of zinc which yield zinc oxide on heating, and hydrous titanium dioxide in the γ-titanic acid modification, in such proportions that for every mol of ZnO in said mixture there will be present more than about 2 mols of TiO₂, at a temperature between about 775 and 975° C., until upon X-ray examination of the material there is found in the diffraction pattern substantially only those lines which are characteristic of rutile, and of a zinc-metatitanate of hexagonal symmetry and the ilmenite structure type.

11. Method of preparing a pigmentary rutile associated with a zinc metatitanate of hexagonal symmetry and of the ilmenite structure type and of the general formula xZnTiO₃.yTiO₂, in which x and y are whole numbers and x is greater than y, which comprises heating a mixture of γ-titanic acid and a zinc compound selected from the group consisting of zinc oxide and compounds of zinc which yield zinc oxide on heating, in such proportions that for every mol of ZnO in said mixture there will be present more than 2 mols of TiO₂, at a temperature between 775 and 975° C.

12. Method of preparing a pigmentary rutile associated with a minor amount of zinc metatitanate of hexagonal symmetry and of the ilmenite structure type, which comprises heating a mixture of γ-titanic acid and a zinc compound selected from the group consisting of zinc oxide and compounds of zinc which yield zinc oxide on heating, in such proportions that for every mol of ZnO in said mixture there will be present more than 4 mols of TiO₂, at a temperature between 775 and 975° C.

13. Method of preparing a composition of matter consisting of rutile associated with a solid solution of titanium dioxide in zinc metatitanate in variable proportions xZnTiO₃.yTiO₂, and which mixture exhibits upon X-ray examination a diffraction pattern comprising substantially only those lines which are characteristic of rutile, and of a zinc-titanium-oxygen compound of hexagonal symmetry and of the ilmenite structure type, which comprises heating a mixture of γ-titanic acid and a zinc compound selected from the group consisting of zinc oxide and compounds of zinc which yield zinc oxide on heating, in such proportions that for every mol of ZnO in said mixture there will be present more than about 2 mols of TiO₂, at a temperature between 775 and 975° C.

14. A white pigment comprising zinc metatitanate of hexagonal symmetry and of the ilmenite structure type containing titanium dioxide in solid solution.

15. A white pigment comprising a mixture of titanium dioxide in the rutile form associated with titanium dioxide in solid solution in zinc metatitanate of hexagonal symmetry and of the ilmenite structure type.

16. A pigmentary composition which contains TiO₂ in solid solution, and which upon X-ray examination produces a diffraction pattern containing substantially only those lines which are characteristic of anatase titanium dioxide and a zinc-titanium-oxygen compound of hexagonal symmetry and of the ilmenite structure type.

17. A pigmentary composition containing an excess of TiO₂ to ZnO over the theoretical required to form ZnTiO₃, at least a proportion of said excess of TiO₂ being in solid solution, but which upon X-ray examination produces among those lines of the diffraction pattern which are due to compounds of zinc substantially only those lines which are characteristic of zinc-titanium-oxygen compound of hexagonal symmetry and of the ilmenite structure type.

18. A pigmentary composition which upon X-ray examination produces a diffraction pattern containing substantially only those lines which are characteristic of rutile titanium dioxide and a zinc-metatitanate of hexagonal symmetry and of the ilmenite structure type and having TiO₂ in solid solution.

19. A pigmentary composition which upon X-ray examination produces a diffraction pattern containing substantially only those lines which are characteristic of anatase titanium dioxide associated with a minor amount of zinc metatitanate of hexagonal symmetry and of the ilmenite structure type and having TiO₂ in solid solution.

20. A pigmentary composition which upon X-ray examination produces a diffraction pattern containing substantially only those lines which are characteristic of rutile titanium dioxide associated with a minor amount of a zinc metatitanate of hexagonal symmetry and of the ilmenite structure type and having TiO₂ in solid solution.

21. A pigmentary composition composed essentially of TiO₂ and ZnO in the ratio of 1 mol of ZnO to at least about 2 mols of TiO₂, and which, upon X-ray examination, produces among the lines of the refraction pattern which are due to compounds of zinc, substantially only those lines which are characteristic of zinc metatitanate of hexagonal symmetry and of ilmenite structure type, and said compound containing TiO₂ in solid solution.

22. A pigmentary composition composed essentially of TiO₂ and ZnO in the ratio of 1 mol of ZnO to at least about 4 mols of TiO₂, and which, upon X-ray examination, produces among the lines of the refraction pattern which are due to compounds of zinc, substantially only those lines which are characteristic of zinc metatitanate of hexagonal symmetry and of ilmenite structure type, and said compound containing TiO₂ in solid solution.

23. A pigmentary composition composed essentially of TiO₂ and ZnO, and in which all of the zinc is present as zinc metatitanate of hexagonal symmetry and of ilmenite structure type, and containing some TiO₂ in solid solution and some free anatase.

ANDREW T. McCORD.
HAROLD F. SAUNDERS.